(12) United States Patent
Lee et al.

(10) Patent No.: US 11,398,051 B2
(45) Date of Patent: Jul. 26, 2022

(54) VEHICLE CAMERA CALIBRATION APPARATUS AND METHOD

(71) Applicant: VADAS Co., Ltd., Gyeongsangbuk-do (KR)

(72) Inventors: Jun-Seok Lee, Gyeongsangbuk-do (KR); Byeong-Chan Jeon, Gyeongsangbuk-do (KR); Jeong-mok Ha, Gyeongsangbuk-do (KR); Hee-soo Kim, Gyeongsangbuk-do (KR)

(73) Assignee: VADAS CO., LTD., Gyeongsangbuk-Do (KR)

( * ) Notice: Subject to any disclaimer, the term of this patent is extended or adjusted under 35 U.S.C. 154(b) by 118 days.

(21) Appl. No.: 16/315,941

(22) PCT Filed: Aug. 8, 2018

(86) PCT No.: PCT/KR2018/009001
§ 371 (c)(1),
(2) Date: Jan. 7, 2019

(87) PCT Pub. No.: WO2019/054636
PCT Pub. Date: Mar. 21, 2019

(65) Prior Publication Data
US 2021/0343044 A1    Nov. 4, 2021

(30) Foreign Application Priority Data
Sep. 13, 2017  (KR) .................. 10-2017-0116914

(51) Int. Cl.
*B60R 1/00*     (2022.01)
*G06T 7/80*     (2017.01)
(Continued)

(52) U.S. Cl.
CPC ................ *G06T 7/80* (2017.01); *B60R 1/00* (2013.01); *G06T 5/002* (2013.01); *G06V 10/44* (2022.01);
(Continued)

(58) Field of Classification Search
None
See application file for complete search history.

(56) References Cited

U.S. PATENT DOCUMENTS

2010/0238283 A1* 9/2010 Kim .......................... G06T 7/73
                                                                348/135
2013/0190981 A1* 7/2013 Dolinar .............. F16M 11/2014
                                                                701/41
(Continued)

FOREIGN PATENT DOCUMENTS

JP      H11281352 A    10/1999
KR   2008-0028531 A     4/2008
(Continued)

*Primary Examiner* — Eileen M Adams
(74) *Attorney, Agent, or Firm* — Panitch Schwarze Belisario & Nadel LLP

(57) ABSTRACT

A vehicle camera calibration apparatus and method are provided. The vehicle camera calibration apparatus includes a camera module configured to acquire an image representing a road from a plurality of cameras installed in a vehicle, an input/output module configured to receive, as an input, the acquired image from the camera module, or output a corrected image, a lane detection module configured to detect a lane and extract a feature point of the lane from an image received from the input/output module, and a camera correction module configured to estimate a new external parameter using a lane equation and a lane width based on initial camera information and external parameter information in the image received from the input/output module, and to correct the image.

16 Claims, 12 Drawing Sheets

(51) Int. Cl.
  *H04N 5/232*  (2006.01)
  *G06T 5/00*  (2006.01)
  *H04N 5/247*  (2006.01)
  *H04N 5/76*  (2006.01)
  *H04N 17/00*  (2006.01)
  *G06V 10/44*  (2022.01)
  *G06V 20/56*  (2022.01)

(52) U.S. Cl.
  CPC ....... *G06V 20/588* (2022.01); *H04N 5/23299* (2018.08); *H04N 5/247* (2013.01); *H04N 5/76* (2013.01); *H04N 17/002* (2013.01); *B60R 2300/105* (2013.01); *B60R 2300/303* (2013.01); *B60R 2300/307* (2013.01); *B60R 2300/402* (2013.01); *B60R 2300/607* (2013.01); *G06T 2207/30256* (2013.01)

(56) References Cited

U.S. PATENT DOCUMENTS

2018/0012084 A1* 1/2018 Okano ............... G06K 9/00798
2018/0286052 A1* 10/2018 Mcardle ................. G06T 7/246

FOREIGN PATENT DOCUMENTS

| KR | 20140033803 A | 3/2014 |
| KR | 20150002039 A | 1/2015 |
| KR | 20150112656 A | 10/2015 |
| KR | 101584907 B1 | 1/2016 |

* cited by examiner

VEHICLE CAMERA CALIBRATION APPARATUS AND METHOD

CROSS-REFERENCE TO RELATED APPLICATION

This application is a Section 371 of International Application No. PCT/KR2018/009001, filed Aug. 8, 2018, which has not yet published, which claims priority under 35 U.S.C. § 119 to Korean Patent Application No. 10-2017-0116914, filed on Sep. 13, 2017, the disclosures of which are incorporated herein by reference.

TECHNICAL FIELD

One or more example embodiments relate to a vehicle camera calibration apparatus and method, and more particularly, to a vehicle camera calibration apparatus and method that may automatically calibrate an external parameter of a camera based on an image of a lane on a road received from a plurality of cameras installed in a vehicle while the vehicle is moving.

BACKGROUND ART

Recently, vehicles employ cameras for various purposes, for example, a black box, or a rear camera for parking. Also, a plurality of cameras are installed in a vehicle to provide a driver with an image appearing as if he or she looks down at the vehicle from the sky, and thus a top view system capable of completely eliminating blind spots of a front side, a rear side, a left side and a right side of the vehicle is being actively developed.

However, when a plurality of cameras are installed in a vehicle, image information transmitted by each of the cameras needs to be integrated and for this, coordinate system is the most important. In other words, each of the images obtained is input together with a variety of information, and real-time spatial information among other stored information of each of the captured images is changed to a preset common coordinate system of the vehicle. A plurality of captured images may be matched based on the real-time spatial information changed to the common coordinate system, making it possible to display a top view image to a driver.

However, it is practically impossible to completely match a plurality of camera coordinate axes to the common coordinate system of the vehicle due to an error that occurs when a camera is mounted in the vehicle. This is because although the error may be precisely calibrated in a vehicle production factory, an installation error of a camera mounted in a vehicle continues to occur due to a change in a position of the camera by a physical force, such as a twist or an impact during driving, after the vehicle is released. Thus, a plurality of cameras mounted in a vehicle need to be calibrated periodically, or at every impact.

To match images input from a plurality of cameras after a vehicle is released, camera calibration needs to be performed to correct any installation error of a camera as a preliminary consideration. For the camera calibration, information such as installation height and installation angle of an installed camera, is required. In a related art, to acquire information for such a camera calibration, a method of installing a specific reference pattern, such as a checkered board, on the ground, capturing the specific reference pattern and acquiring information based on a pattern image is used.

It is common to oblation the camera information by using a specific reference pattern, a relative position of the specific marker is known this advance, precise camera information may be acquired. However, to perform the method, there is a need to perform an operation after securing a space large enough to install a specific reference pattern around a vehicle.

In particular, since an installation error of a camera occurs periodically or every time an impact occurs due to actual travelling of the vehicle, it is too troublesome, time consuming, and costly for an operator to learn camera information using a camera information acquisition method using a specific reference pattern, and to perform a camera calibration every time the installation error occurs. Thus, there is a need to automatically calibrate a camera even when a vehicle is travelling.

Korean Patent Publication No. 10-2008-0028531, published on Apr. 1, 2008, is provided as a related art.

DISCLOSURE OF INVENTION

Technical Subject

Example embodiments provide a vehicle camera calibration apparatus and method that may receive images representing a travelling road of a vehicle from a plurality of cameras installed in the vehicle during travelling of the vehicle, that may detect a lane of the road from the images and that may automatically correct an external parameter of a camera installed in the vehicle based on the detected lane, so as to quickly and easily calibrate a camera in which a physical installation error occurs due to travelling of the vehicle, even when the vehicle is travelling.

However, aspects of example embodiments of the present disclosure are not limited to those described above. Other aspects that are not described herein will be clearly understood by a person having ordinary skill in the art from descriptions below.

Technical Solution

According to an aspect, there is provided a vehicle camera calibration apparatus including a camera module configured to acquire an image representing a road from a plurality of cameras installed in a vehicle, an input/output module configured to receive, as an input, the acquired image from the camera module, or output a corrected image, a lane detection module configured to detect a lane and extract a feature point of the lane from an image received from the input/output module, and a camera correction module configured to calculate a lane equation and a lane width based on initial camera information and external parameter information in the image received from the input/output module, to estimate a new external parameter, and to correct the image.

The input/output module may include an image inputter/outputter configured to receive, as an input, an image from the camera module or to output a corrected image to another module, and a storage configured to receive the corrected image and changed external parameter information from the camera correction module, and to store the corrected image and the changed external parameter information.

The lane detection module may include an image processor configured to remove noise from the image received from the input/output module, a frame accumulator configured to accumulate images processed by the image processor as consecutive frames, when a lane is marked with a dashed line, an edge detector configured to detect an edge and to extract a feature point from a cumulative image including the images accumulated by the frame accumulator, and a lane determiner configured to determine a lane from the feature point extracted by the edge detector.

The camera correction module may include an image converter configured to extract a feature point of a lane from a received image based on initial camera information and external parameter information and to convert the received image into a top-view image, an equation calculator configured to acquire a lane equation from the top-view image acquired by the image converter, a parameter estimator configured to estimate a new external parameter using the lane equation calculated by the equation calculator, and a corrector configured to correct an image using the new external parameter estimated by the parameter estimator.

According to another aspect, there is provided a vehicle camera calibration method including a lane detection operation of receiving, as an input, an acquired image from a camera module and detecting a lane, an image conversion operation of extracting a feature point of a lane from a received image based on initial camera information and external parameter information, and converting the received image into a top-view image, an equation calculation operation of acquiring a lane equation and a lane width from the top-view image acquired in the image conversion operation, a parameter estimation operation of estimating a new external parameter using the lane equation calculated in the equation calculation operation, and an image correction operation of correcting an image using the new external parameter estimated in the parameter estimation operation.

The lane detection operation may include an image processing operation of removing noise from an image received from an input/output module, a frame accumulation operation of accumulating images processed in the image processing operation as consecutive frames when a lane is marked with a dashed line in an image processed in the image processing operation, and immediately performing a next operation when the lane is marked with a straight line, an edge detection operation of detecting an edge and extracting a feature point from a cumulative image including the images accumulated in the frame accumulation operation, and a lane determination operation of determining a lane from the feature point extracted in the edge detection operation.

The image processing operation may include performing an algorithm of softening a boundary of an object in an image to remove noise.

The image processing operation may include removing noise by changing a size of an image to prevent a region corresponding to a split lane in an acquired image from being detected as an edge.

The frame accumulation operation may include comparing all pixel values of the cumulative image and storing a highest pixel value in a new image so that a dashed-line lane in an acquired image is viewed to be identical to a solid-line lane.

The edge detection operation may include detecting an edge using an algorithm and extracting the edge and central coordinates of the edge as feature points.

The lane determination operation may include detecting a longest outline among lines represented by feature points extracted in the edge detection operation and determining the longest outline as a lane.

The lane equation calculated in the equation calculation operation may be expressed as an equation of a straight line, or a multi-dimensional equation.

The parameter estimation operation may include a primary correction operation of determining whether correction information of a pitch (Rx), a yaw (Ry) and a roll (Rz) of a front camera of a vehicle, and correction information of a pitch (Rx), a yaw (Ry) and a roll (Rz) of a rear camera of the vehicle are accurate, of performing a next operation when the correction information is accurate, and of calculating the correction information of the pitch (Rx), the yaw (Ry) and the roll (Rz) of the front camera and the correction information of the pitch (Rx), the yaw (Ry) and the roll (Rz) of the rear camera and returning to the image conversion operation when the correction information is inaccurate, a secondary correction operation of determining whether correction information of a position translation (Tz) of a rear camera of a vehicle is accurate, of performing a next operation when the correction information is accurate, and of calculating the correction information of the position translation (Tz) of the rear camera and returning to the image conversion operation when the correction information is inaccurate, tertiary correction operation of determining whether correction information of a pitch (Rx), a yaw (Ry), a roll (Rz) and a position translation (Tz) of each of a left camera and a right camera of a vehicle is accurate, of performing a next operation when the correction information is accurate, and of calculating the correction information of the pitch (Rx), the yaw (Ry), the roll (Rz) and the position translation (Tz) of each of the left camera and the right camera and returning to the image conversion operation when the correction information is inaccurate, and a storage operation of storing external parameters calculated in the primary correction operation through the tertiary correction operation.

The correction information of the pitch (Rx) of each of the front camera and the rear camera in the primary correction operation may be calculated by modifying a new pitch (Rx) and repeating a process from the image conversion operation until Equation 1 shown below is satisfied.

$$\frac{1}{G_l} - \frac{1}{G_r} = 0 \qquad \text{[Equation 1]}$$

Here, $G_l$ denotes a slope of a left lane, and $G_r$ denotes a slope of a right lane.

The correction information of the yaw (Ry) of each of the front camera and the rear camera in the primary correction operation and the secondary correction operation may be calculated by modifying a new yaw (Ry) and repeating a process from the image conversion operation until Equation 2 shown below is satisfied.

$$W_l - W_r = 0 \qquad \text{[Equation 2]}$$

Here, $W_l$ denotes a width of a left lane, and $W_r$ denotes a width of a right lane.

The correction information of the roll (Rz) of each of the front camera and the rear camera in the primary correction operation may be calculated by modifying a new roll (Rz) and repeating a process from the image conversion operation until Equation 3 shown below is satisfied.

$$\frac{1}{G_l} + \frac{1}{G_r} = 0 \qquad \text{[Equation 3]}$$

Here, $G_l$ denotes a slope of a left lane, and $G_r$ denotes a slope of a right lane.

The correction information of the position translation (Tz) of the rear camera in the secondary correction operation may be calculated by modifying a new position translation (Tz) and repeating a process from the image conversion operation until Equation 4 shown below is satisfied.

$$C_f - C_r = 0 \quad \text{[Equation 4]}$$

Here, $C_f$ denotes a width between a left lane and a right lane in a front road, and $C_r$ denotes a width between a left lane and a right lane in a rear road.

The correction information of the pitch (Rx) of the left camera in the tertiary correction operation may be calculated by modifying a new pitch (Rx) and repeating a process from the image conversion operation until Equation 5 shown below is satisfied. The correction information of the pitch (Rx) of the right camera in the tertiary correction operation may be calculated by modifying a new pitch (Rx) and repeating a process from the image conversion operation until Equation 6 shown below is satisfied.

$$\frac{(x_2 + x_6)}{2} - \frac{(x_1 + x_5)}{2} = 0 \quad \text{[Equation 5]}$$

$$\frac{(x_3 + x_7)}{2} - \frac{(x_4 + x_8)}{2} = 0 \quad \text{[Equation 6]}$$

Here, $x_1$ denotes a left x-coordinate of a left lane of a front road, $x_2$ denotes a right x-coordinate of the left lane of the front road, $x_5$ denotes a left x-coordinate of a left lane of a rear road, $x_6$ denotes a right x-coordinate of the left lane of the rear road, $x_3$ denotes a left x-coordinate of a right lane of the front road, $x_4$ denotes a right x-coordinate of the right lane of the front road, $x_7$ denotes a left x-coordinate of a right lane of the rear road, and $x_8$ denotes a right x-coordinate of the right lane of the rear road.

The correction information of the yaw (Ry) of the left camera in the tertiary correction operation may be calculated by modifying a new yaw (Ry) and repeating a process from the image conversion operation until Equation 7 shown below is satisfied. The correction information of the yaw (Ry) of the right camera in the tertiary correction operation may be calculated by modifying a new yaw (Ry) and repeating a process from the image conversion operation until Equation 8 shown below is satisfied.

$$(x_{22} - x_{11}) - (x_{66} - x_{55}) = 0 \quad \text{[Equation 7]}$$

$$(x_{44} - x_{33}) - (x_{88} - x_{77}) = 0 \quad \text{[Equation 8]}$$

Here, $x_{11}$ denotes a left x-coordinate of a left lane of a front road, $x_{22}$ denotes a right x-coordinate of the left lane of the front road, $x_{55}$ denotes a left x-coordinate of a left lane of a rear road, $x_{66}$ denotes a right x-coordinate of the left lane of the rear road, $x_{33}$ denotes a left x-coordinate of a right lane of the front road, $x_{44}$ denotes a right x-coordinate of the right lane of the front road, $x_{77}$ denotes a left x-coordinate of a right lane of the rear road, and $x_{88}$ denotes a right x-coordinate of the right lane of the rear road.

The correction information of the roll (Rz) of the left camera in the tertiary correction operation may be calculated by modifying a new roll (Rz) and repeating a process from the image conversion operation until Equation 9 shown below is satisfied. The correction information of the roll (Rz) of the right camera in the tertiary correction operation may be calculated by modifying a new roll (Rz) and repeating a process from the image conversion operation until Equation 10 shown below is satisfied.

$$\frac{1}{G_l} = 0 \quad \text{[Equation 9]}$$

$$\frac{1}{G_r} = 0 \quad \text{[Equation 10]}$$

Here, $G_l$ denotes a slope of a left lane, and $G_r$ denotes a slope of a right lane.

The correction information of the position translation (Tz) of the left camera in the tertiary correction operation may be calculated by modifying a new position translation (Tz) and repeating a process from the image conversion operation until Equation 11 shown below is satisfied. The correction information of the position translation (Tz) of the right camera in the tertiary correction operation may be calculated by modifying a new position translation (Tz) and repeating a process from the image conversion operation until Equation 12 shown below is satisfied.

$$\frac{(x_{222} - x_{111}) + (x_{10} - x_{999})}{2} - (x_{666} - x_{555}) = 0 \quad \text{[Equation 11]}$$

$$\frac{(x_{444} - x_{333}) + (x_{12} - x_{11})}{2} - (x_{888} - x_{777}) = 0 \quad \text{[Equation 12]}$$

Here, $x_{111}$ denotes a left x-coordinate of a left lane of a front road, $x_{222}$ denotes a right x-coordinate of the left lane of the front road, $x_{555}$ denotes a left x-coordinate of a left lane, $x_{666}$ denotes a right x-coordinate of the left lane, $x_{999}$ denotes a left x-coordinate of a left lane of the rear road, $x_{10}$ denotes a right x-coordinate of the left lane of the rear road, $x_{333}$ denotes a left x-coordinate of a right lane of a front road, $x_{444}$ denotes a right x-coordinate of a right lane of a front road, $x_{777}$ denotes a left x-coordinate of a right lane, $x_{888}$ denotes a right x-coordinate of a right lane, $x_{11}$ denotes a left x-coordinate of a right lane of the rear road, and $x_{12}$ denotes a right x-coordinate of the right lane of the rear road.

Effect of the Invention

According to example embodiments, a camera calibration may be performed by receiving images representing a travelling road of a vehicle captured from a plurality of cameras installed in the vehicle, by detecting a lane from the images, and by correcting an external parameter of a camera installed in the vehicle based on the detected lane. Thus, it is possible to quickly and simply calibrate a camera without the need to stop the vehicle.

Also, according to example embodiments, a camera calibration may be performed during travelling of a vehicle, and thus there is no need to perform a secondary operation, such as an operation of securing a space and installing a correction pattern after a vehicle stops for a correction of a camera installed in the vehicle in a related art. Thus, it is possible to reduce time or costs required for a camera correction.

BEST MODE FOR CARRYING OUT THE INVENTION

Advantages and features of example embodiments of the present disclosure, and methods of achieving the same will be clearly understood with reference to the accompanying drawings and the following detailed example embodiments. However, the present disclosure may be embodied in many different forms and should not be construed as being limited to the example embodiments set forth herein. Rather, these example embodiments are provided so that this disclosure will be thorough and complete, and will fully convey the inventive concept to those of ordinary skill in the art. The inventive concept is defined by the appended claims. Therefore, the meanings of terms should be interpreted based on the scope throughout this specification.

When it is determined detailed description related to a related known function or configuration they may make the purpose of the present invention unnecessarily ambiguous in describing the present invention, the detailed description will be omitted here. Also, terminologies used herein are defined to appropriately describe the embodiments of the present invention and thus may be changed depending on a user, the intent of an operator, or a custom of a field to which the present invention pertains. Accordingly, the terminologies must be defined based on the following overall description of this specification.

Hereinafter, example embodiments of the present disclosure will be described in detail with reference to the accompanying drawings.

To actually use a vehicle camera calibration apparatus and method according to an example embodiment, a lane may need to be viewed without any obstacle in an image captured by a camera installed in a vehicle, and both a dashed-line lane and a solid-line lane may need to be present. Also, the road may need to be flat and straight.

For example, when a road is not flatland, a correction may be performed, however, the accuracy of a corrected external parameter may decrease. To prevent the above problem, it is desirable to perform the correction on a flatland.

Also, an algorithm that will be described below is an example of the present disclosure, and accordingly the present disclosure is not limited to the algorithm. For example, another algorithm that performs a corresponding function may be used.

Figure 1:
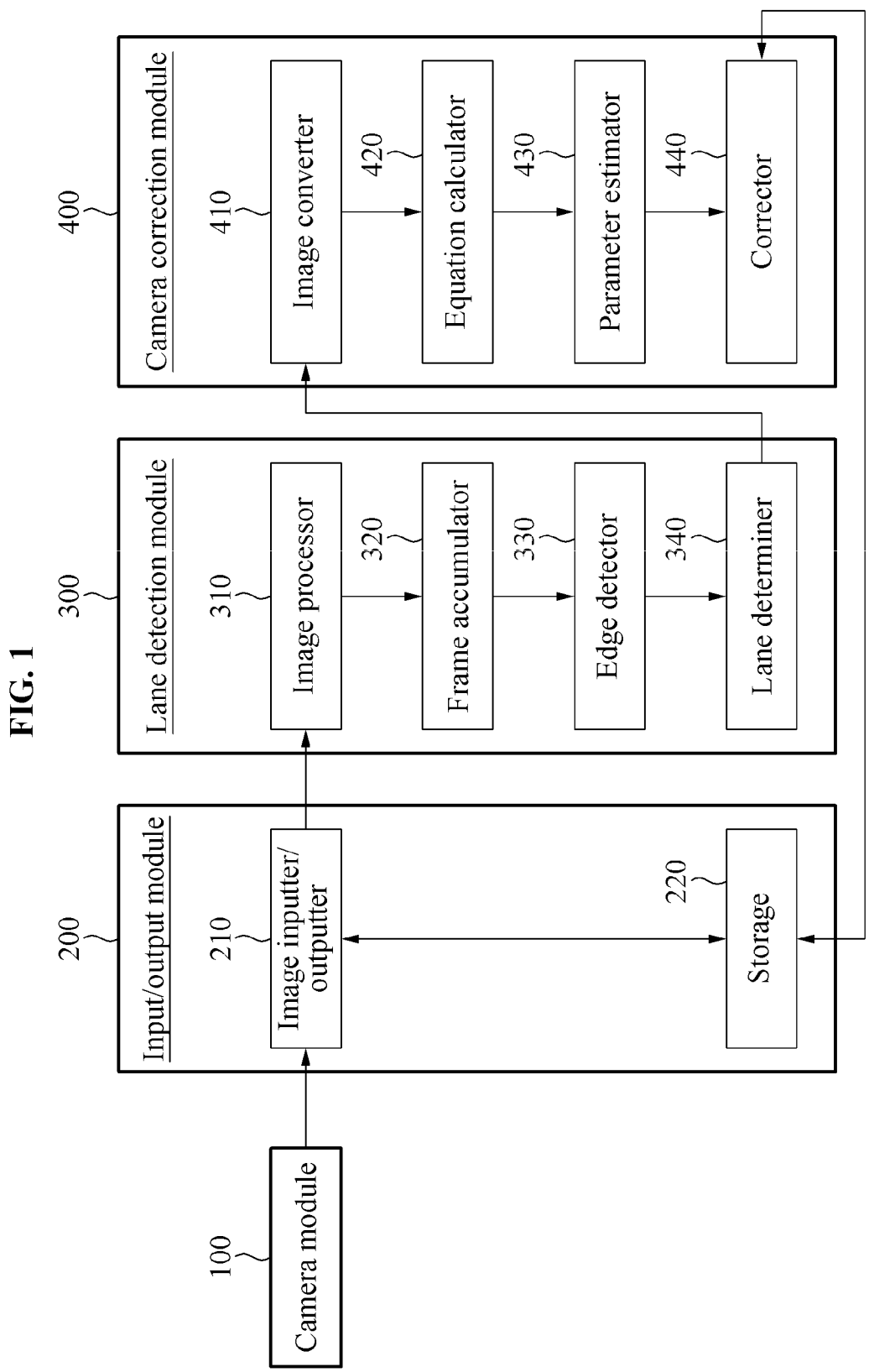
FIG. 1 is a diagram illustrating a vehicle camera calibration apparatus according to an example embodiment.

FIG. 1 is a diagram illustrating a vehicle camera calibration apparatus according to an example embodiment. The vehicle camera calibration apparatus may include a camera module 100 configured to acquire an image representing a road from a plurality of cameras installed in a vehicle, an input/output module 200 configured to receive, as an input, the acquired image from the camera module 100 or to output a corrected image, a lane detection module 300 configured to detect a lane and extract a feature point of the lane from an image received from the input/output module 200, and a camera correction module 400 configured to calculate a lane equation and a lane width based on initial camera information and external parameter information in the image received from the input/output module 200, to estimate a new external parameter, and to correct the image.

The camera module 100 refers to a device in which a plurality of cameras are installed in an arbitrary position of the vehicle, and may perform a function of acquiring an image by capturing a road from the plurality of cameras. In an example embodiment, a total of four cameras are installed in a front side, a rear side, a left side and a right side of a vehicle. Thus, all surroundings of the vehicle may be visualized by eliminating a blind spot when the surroundings of the vehicle are captured. This is merely an example, and a number of cameras installed in the vehicle may be increased or reduced.

A camera of the camera module 100 may use a wide-angle lens with a viewing angle greater than that of a typical lens, or a fisheye lens that is a super-wide-angle lens exceeding 180°. Accordingly, to generate a top-view image, it is desirable to capture all surroundings of a vehicle during matching of camera images. However, a type of cameras of the camera module 100 capable of calibrating a vehicle camera may be applicable regardless of the above-described angle of view.

When the four cameras of the camera module 100 are installed on the front side, the rear side, the left side and the right side of the vehicle, and are calibrated using a lane, posture information of each of the cameras, that is, a pitch (Rx), a yaw (Ry) and a roll (Rz) that are external parameters indicating a degree of rotation of a camera at a specific position, and a position translation (Tz) that is an external parameter indicating a degree to which a rear camera, a left camera and a right camera are moved from specific positions, may be estimated.

In other words, in an example of a straight lane on a straight road, the straight lane may appear to be vertical when viewed from a top-view image, and all lanes shown using the four cameras may be present on one of straight lanes. In this example, when a camera correction is accurate, the lanes may be viewed as one lane. When the camera correction is inaccurate, the lanes may be viewed as several lanes. Based on the above characteristic, it is possible to estimate several external parameters.

However, it is assumed that when a correction is performed as described above, a vehicle travels on a straight lane on a flat ground and both lanes and vehicles travel in parallel.

Also, the camera module 100 may be connected via a wire or wirelessly to the input/output module 200 that will be described below, and may transmit an image captured by the camera.

The input/output module 200 may be a module configured to receive, as an input, an image acquired from the camera module 100, or to output a corrected image from the camera correction module 400 that will be described below to an output device that may be recognized by a user. The input/output module 200 may include an image inputter/outputter 210, and a storage 220.

When an image captured by a camera of the camera module 100 is received and transferred to an image processor 310 of the lane detection module 300, or when an image corrected by a corrector 440 of the camera correction module 400 is stored in the storage 220 that will be described below, the image inputter/outputter 210 may receive the image and output the image to an external device, such as a monitor, and the like, that may be recognized by a user. Also, the image inputter/outputter 210 may perform an image preprocessing process by an image filter, and the like, if necessary.

The storage 220 may store the image corrected by the corrector 440 of the camera correction module 400 as described above, and may also store information about an external parameter of a new camera estimated by a parameter estimator 430 of the camera correction module 400.

Also, the storage 220 may store initial camera information, that is, information about an internal parameter, such as a focal length, a principal point, a distortion coefficient, and the like, corresponding to unique characteristics of a plurality of camera lenses of the camera module 100, and store initial external parameter information, such as initial posture information and position information of a plurality of cameras of the camera module 100.

The initial camera information and the initial external parameter information stored in the storage 220 may be provided to the camera correction module 400 that will be described below, and may be used to estimate a new external parameter. An image completely corrected in the camera correction module 400 may be provided to be processed and utilized in various devices, for example, a top view system, a panoramic view system, and the like.

The lane detection module 300 may perform a function of detecting a lane and extracting a feature point of the lane from an image received from the input/output module 200, and may be a module that includes various algorithms to perform the function. The lane detection module 300 may include the image processor 310, a frame accumulator 320, an edge detector 330, and a lane determiner 340.

The image processor 310 may include an image processing algorithm to remove noise from an image received from the image inputter/outputter 210 of the input/output module 200 and to perform image processing so that a boundary of a lane on a road may be more clearly shown.

An algorithm used by the image processor 310 to remove noise from an image and to perform the image processing is not limited to an algorithm that will be described below, and may be replaced with another algorithm to perform a corresponding function.

The image processor 310 may convert a color image received from the image inputter/outputter 210 into a monochromatic image, for the above-described noise removal and image processing. In other words, the image processor 310 may use the received color image for the noise removal and the image processing without a change, or may convert the color image into a monochromatic image and use the monochromatic image.

The image processor 310 may apply an algorithm to remove noise from an image, as described above. For example, the image processor 310 may perform a morphological operation and median filtering.

The morphological operation performed by the image processor 310 may be a type of image filtering used in a preprocessing process, for example, a noise removal, an extraction of a feature point, and the like, prior to a separation of images, that is, a real image processing, and may include an erosion operation and a dilation operation. According to an example embodiment, a morphological opening may be performed after a morphological closing.

A morphological closing performed in the image processor 310 may have an effect of softening a boundary of an object appearing in an image, so as to remove discontinuous data from the image by softening the boundary.

By a morphological opening performed after the morphological closing performed in the image processor 310, noise may be removed and a size of an object may be maintained.

To remove noise, the image processor 310 may perform median filtering as well as the morphological closing and the morphological opening that are sequentially applied.

The image processor 310 may remove noise by changing a size of an image after the median filtering is performed. Split lanes may appear in a considerable number of portions of images acquired by a left camera and a right camera of the camera module 100, and a lane recognition rate in the lane determiner 340 may decrease when the portions corresponding to the split lanes are detected as edges by the edge detector 330. Thus, it is possible to prevent a reduction in the lane recognition rate by removing noise from the portions corresponding to the split lanes.

When a lane appearing in an image processed by the image processor 310, that is, an image from which noise is removed, is marked with a dashed line, the frame accumulator 320 may perform a function of accumulating the image as consecutive frames. When the lane is marked with a straight line, an image processed by the image processor 310 may be transmitted to the edge detector 330 by passing through the frame accumulator 320 without a change.

In an example embodiment, the frame accumulator 320 may accumulate four frames. A number of frames to be accumulated is merely an example, and may be changed, if necessary.

Image frames may be accumulated in the frame accumulator 320 as described above, so that a dashed-line lane appearing in an image may be viewed to be identical to a solid-line lane. This is because the lane detector 340 more easily and accurately determine and detect a solid-line lane.

Through an accumulation of frames in the frame accumulator 320, a dashed-line lane in an image may be viewed to be identical to a solid-line lane, by comparing all pixel values in four consecutive images from which noise is removed, that is, a cumulative image including the four accumulated images, and by storing a highest pixel value in a new image.

The edge detector 330 may detect an edge and extract a feature point from a lower end portion of a cumulative image of the frame accumulator 320.

Since a lane appears in a lower half region of the cumulative image and sky appears in an upper region, the edge detector 330 may define a region other than the above regions as a region of interest (ROI) to reduce a number of operations.

Since a boundary between a road color and a lane color is clear, the edge detector 330 may detect an edge using a Canny edge algorithm that may remove all edges associated with a gray matter of the original image while most effectively finding a contour, after an edge is allowed to strongly appear through an image processing. Due to a low error rate and accurate positions of edge points, the Canny edge algorithm may be used in the edge detector 330. Although the Canny edge algorithm is provided as an example of an edge detection algorithm used in the edge detector 330, example embodiments are not limited thereto. Accordingly, other algorithms may also be used if necessary.

The edge detector 330 may extract the edge and central coordinates of the edge as feature points. Because an edge appears as noise of a vehicle in an image as well as a lane in the image, an edge and central coordinates of the edge may be used to reduce an edge that appears widely.

When the edge detector 330 extracts the edge and the central coordinates of the edge as feature points, the lane in the image may be displayed as a single long line, and noise may be displayed as a relatively short line or may not be displayed.

The lane determiner 340 may determine a lane from a feature point extracted in the edge detector 330.

Various schemes of determining a lane from a feature point in the lane determiner 340 may be used. For example, the lane determiner 340 may detect the longest outline among lines represented by feature points extracted in the edge detector 330, and may determine the longest outline as a lane.

The lane determiner 340 may find two outlines from images acquired by the front camera and the rear camera of the camera module 100, and may find one outline from images acquired by the left camera and the right camera. This is because a total of two lanes on a left side and a right side are monitored by the front camera and the rear camera, and one lane is monitored by the left camera and the right camera. The lane determiner 340 may determine the found outlines as lanes.

The camera correction module 400 may be a module configured to perform a function of correcting external parameters of the four cameras that are installed in the front side, the rear side, the left side and the right side of the vehicle, based on a lane detected by the lane detection module 300. The camera correction module 400 may include an image converter 410, an equation calculator 420, the parameter estimator 430, and the corrector 440.

The camera correction module 400 may calculate a lane equation and a lane width based on initial camera information and external parameter information in an image received from the input/output module 200, may estimate a new external parameter based on the calculated lane equation and the calculated lane width, and may correct the image.

When an external parameter is accurate and when a conversion to a top-view image is performed, lanes on the top-view image may be on the same straight line and may be vertically shown. However, when a position of a camera of the camera module 100 is changed by a physical force, an accuracy of the external parameter may decrease and the lanes on the top-view image may not exist on a straight line. Thus, based on the above characteristic, an external parameter of a changed camera may be estimated.

The image converter 410 may extract a feature point of a lane from a received image based on initial camera information and external parameter information, and may convert the received image into a top-view image.

The image converter 410 may convert the received image into a top-view image, based on a vertically represented top-view image, however, there is not limitation thereto. In addition to the vertically represented top-view image, a top-view image at any angle may also be used.

For example, a top-view image that allows a vehicle to be horizontally viewed as well as a top-view image that allows a vehicle to be vertically viewed may be configured. In this example, an equation associated with a slope that will be described below may be defined differently based on a vertical top-view image or a horizontal top-view image.

In other words, when a top-view image that is converted so that a vehicle is horizontally viewed is configured, a corresponding slope may be perpendicular to a slope of a top-view image that is converted so that a vehicle is vertically viewed, and accordingly all equations for the slopes may be changed. However, based on a top-view image converted so that a vehicle is vertically viewed, a corresponding slope and an equation may be determined, which will be described below. This is merely an example, and a top-view image that is converted so that a vehicle is horizontally viewed may also be used.

The equation calculator 420 may acquire the lane equation by line fitting of feature points in the top-view image acquired in the image converter 410. For the line fitting, a least mean square (LMS) algorithm may be used. Also, the lane equation may be an equation of a straight line, or a multi-dimensional equation.

The parameter estimator 430 may estimate a new external parameter based on the lane equation calculated by the equation calculator 420.

The corrector 440 may correct an image based on the new external parameter estimated by the parameter estimator 430, and may transmit the image to the storage 220.

Hereinafter, a method of calibrating a vehicle camera using a vehicle camera calibration apparatus configured as described above will be described in detail.

Figure 2:
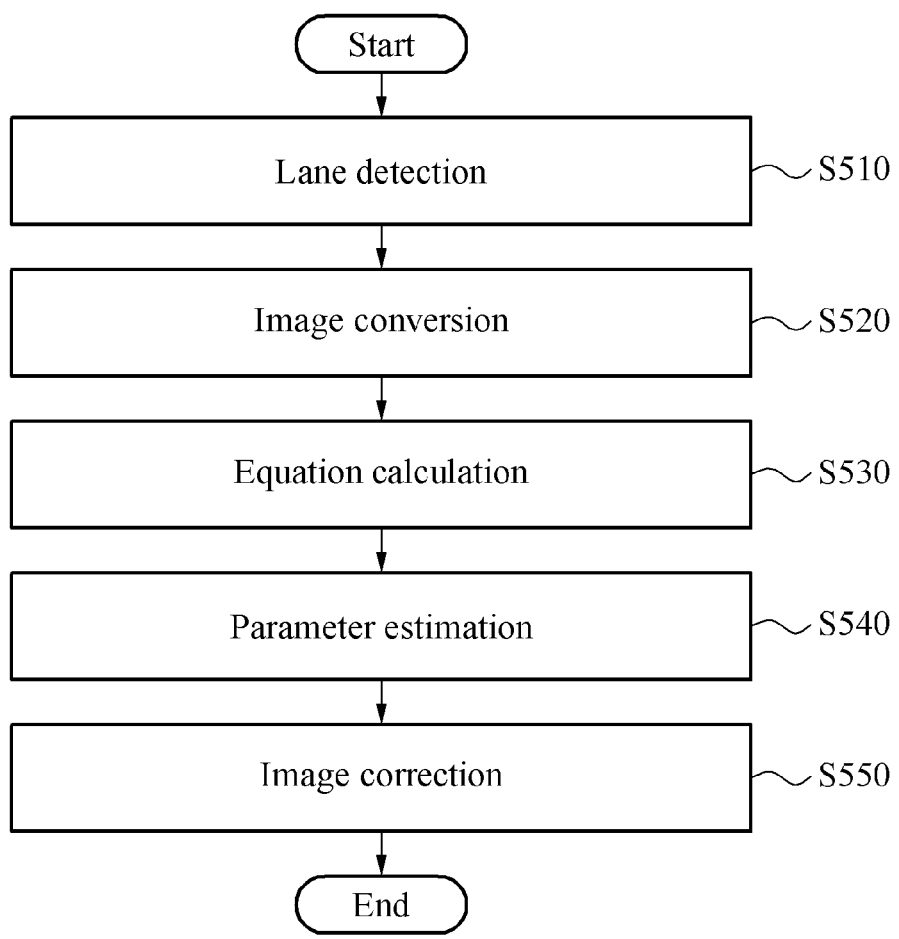
FIG. 2 is a flowchart illustrating a vehicle camera calibration method according to an example embodiment.

FIG. 2 is a flowchart illustrating a vehicle camera calibration method according to an example embodiment. The vehicle camera calibration method may include lane detection operation S510, image conversion operation S520, equation calculation operation S530, parameter estimation operation S540, and image correction operation S550.

Figure 3:
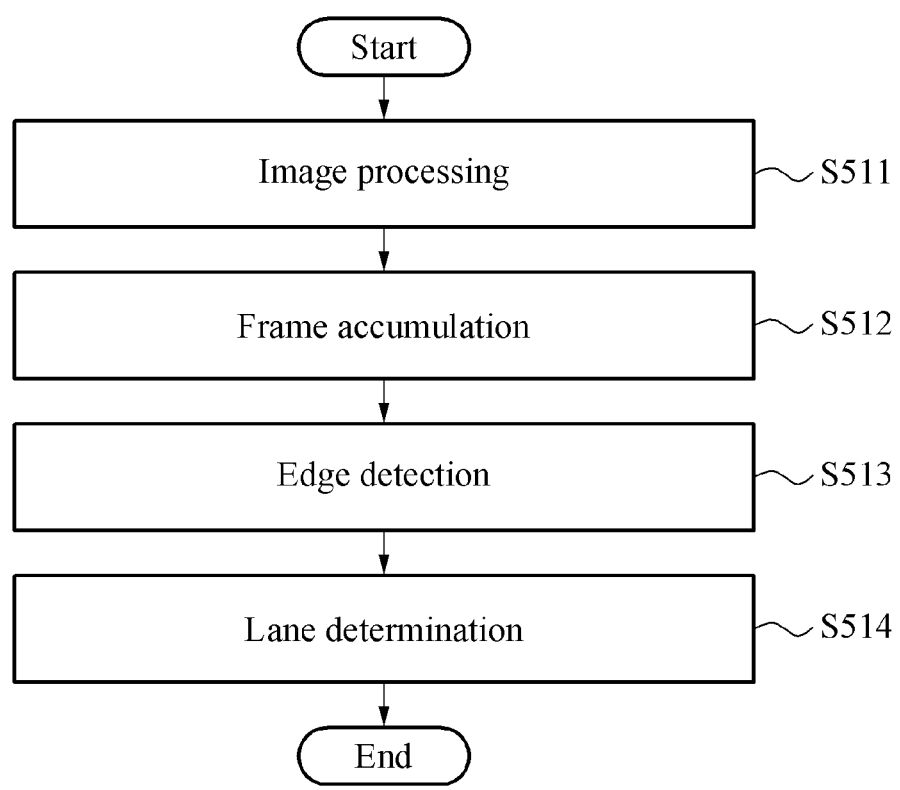
FIG. 3 is a flowchart illustrating operations included in a lane detection operation of FIG. 2.

Referring to FIG. 3, lane detection operation S510 may be an operation of detecting a lane and extracting a feature point of the lane in the lane detection module 300 when an image acquired from a camera of the camera module 100 is input through the image input/output module 200, and may include image processing operation S511, frame accumulation operation S512, edge detection operation S513, and lane determination operation S514.

Image processing operation S511 may be an operation of removing noise from a received image and of performing an image processing to more clearly display a boundary of a lane of a road using the image processor 310 in the lane detection module 300.

The image processor 310 may convert a color image received from the image inputter/outputter 210 into a monochromatic image, for the above-described noise removal and image processing. In other words, the image processor 310 may use the received color image for the noise removal and the image processing without a change, or may convert the color image into a monochromatic image and use the monochromatic image.

In image processing operation S511, an algorithm of softening a boundary of an object in an image to remove noise may be performed. For example, in an example embodiment, a morphological operation may be performed. Also, a median filtering may be performed to remove additional noise.

In image processing operation S511, noise may be removed by changing a size of an image on which median filtering is performed, to prevent a region corresponding to a split lane in an acquired image from being detected as an edge.

Example embodiments are not limited to the above morphological operation algorithm and the above median filtering algorithm performed in image processing operation S511, and other algorithms that perform corresponding functions may be used.

In frame accumulation operation S512, the lane detection module 300 may accumulate, using the frame accumulator 320, an image from which noise is removed as consecutive frames, when a lane is marked with a dashed line in an image processed in image processing operation S511. When the lane is marked with a straight line, the next operation may be performed immediately.

In frame accumulation operation S512, when a lane appearing in an acquired image is marked with a dashed line, instead of a straight line, all pixel values in a cumulative image may be compared so that a dashed-line lane is viewed to be identical to a solid-line lane that is a straight line, and a highest pixel value may be stored in a new image.

Edge detection operation S513 may refer to an operation of detecting an edge and extracting a feature point from a lower end portion of the cumulative image using the edge detector 330 of the lane detection module 300.

In edge detection operation S513, an edge may be detected, and the edge and central coordinates of the edge may be extracted as feature points. For example, a Canny edge algorithm may be used.

Lane determination operation S514 may refer to an operation of determining a lane from a feature point extracted in the edge detector 330 using the lane determiner 340 of the lane detection module 300.

In lane determination operation S514, various schemes of determining a lane from a feature point in the lane determiner 340 may be used. For example, in lane determination operation S514, the lane determiner 340 may detect the longest outline among lines represented by feature points extracted in the edge detector 330, and may determine the longest outline as a lane.

The above description of the vehicle camera calibration apparatus is also applicable to image processing operation S511, frame accumulation operation S512, edge detection operation S513 and lane determination operation S514 in lane detection operation S510, and accordingly further description of image processing operation S511, frame accumulation operation S512, edge detection operation S513 and lane determination operation S514 is not repeated herein.

Image conversion operation S520 may refer to an operation of extracting a feature point of a lane from a received image based on stored initial camera information and stored initial external parameter information, and converting the received image into a top-view image, using the image converter 410 of the camera correction module 400.

As described above, when an external parameter is accurate and when a conversion to a top-view image is performed, lanes on the top-view image may be on the same straight line and may be vertically shown. However, when a position of a camera of the camera module 100 is changed by a physical force, and when the received image is converted into a top-view image based on the initial camera information and the initial external parameter information, the lanes on the top-view image may not exist on a straight line.

Thus, in image conversion operation S520, the received image may be converted into the top-view image so that an external parameter of the changed camera may be estimated in the next operation.

Equation calculation operation S530 may refer to an operation of acquiring a lane equation and a lane width from the top-view image acquired in image conversion operation 520, so that a new external parameter may be easily estimated based on the lane equation and the lane width in the next operation.

In equation calculation operation S530, the equation calculator 420 of the camera correction module 400 may acquire the lane equation by line fitting of feature points in the top-view image acquired in the image converter 410. For the line fitting, a least mean square (LMS) algorithm may be used. The LMS algorithm used for line fitting is merely an example, and another algorithm may also be used.

The lane equation calculated in equation calculation operation S530 may be an equation of a straight line, or a multi-dimensional equation. An equation calculated when a lane equation is an equation of a straight line may be expressed as Equation 1 shown below.

$$y=ax+b \qquad \text{[Equation 1]}$$

a: Slopes $G_l$ and $G_r$ of lanes that appear later
b: y-intercept of a lane
x, y: Coordinate points of a lane that are obtained in advance In other words, in equation calculation operation S530, values of x and y in Equation 1 may be set from an image, and a purpose of an equation calculation operation is to obtain a and b from the values. In Equation 1, a denotes a slot of a lane that appears later, and b denotes a y-intercept of a lane. Lane equations, that is, a and b may be acquired using line fitting based on the values of x and y that are coordinate points of a lane that are obtained in advance.

Figure 4:
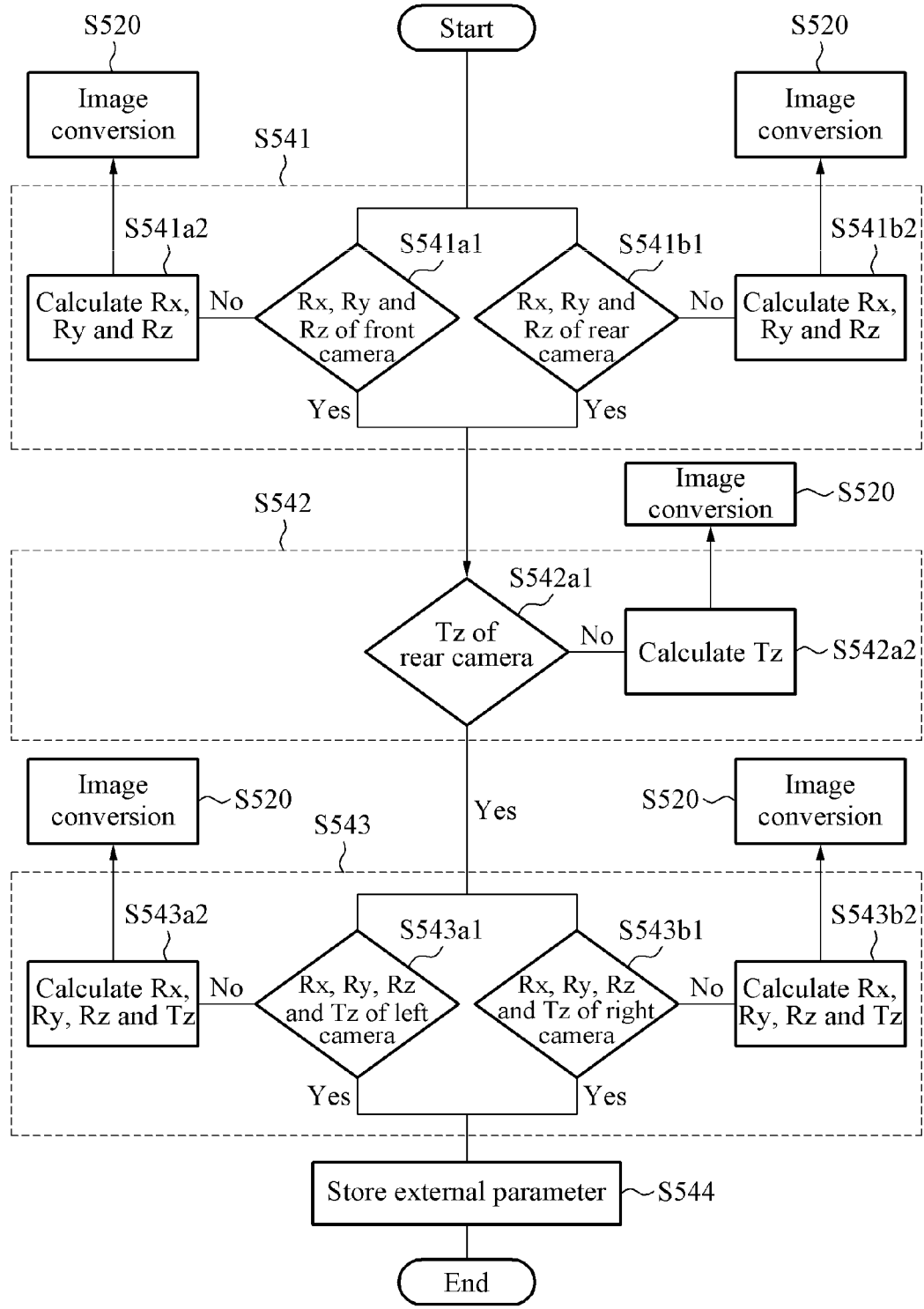
FIG. 4 is a flowchart illustrating operations included in a parameter estimation operation of FIG. 2.

Referring to FIG. 4, parameter estimation operation S540 may be an operation of estimating a new external parameter based on the lane equation and the lane width calculated in the equation calculation operation, and may include primary correction operation S541, secondary correction operation S542, tertiary correction operation S543 and storage operation S544.

In primary correction operation S541, secondary correction operation S542 and tertiary correction operation S543 of parameter estimation operation S540, lane detection operation S510, image conversion operation S520 and equation calculation operation S530 are assumed to be the same to calculate a lane equation and a lane width of a camera.

In other words, a process of detecting a lane using each of a front camera, a rear camera, a left camera and a right camera, performing a conversion to a top-view image and acquiring a lane equation and a lane width may be individually performed for each primary correction operation S541, secondary correction operation S542 and tertiary correction operation S543.

Although the process is represented as one process including lane detection operation S510, image conversion operation S520 and equation calculation operation S530 in an example embodiment, lane detection operation S510, image conversion operation S520 and equation calculation operation S530 may be individually performed for each camera, actually, in primary correction operation S541, secondary correction operation S542 and tertiary correction operation S543.

In primary correction operation S541, whether correction information of a pitch (Rx), a yaw (Ry) and a roll (Rz) of a front camera of a vehicle is accurate may be determined in operation S541a1, and whether correction information of a pitch (Rx), a yaw (Ry) and a roll (Rz) of a rear camera of the vehicle is accurate may be determined in operation S541b1. When the correction information is accurate, the next operation may be performed. When the correction information is inaccurate, the correction information of the pitch (Rx), the yaw (Ry) and the roll (Rz) of the front camera may be calculated in operation S541a2, and the correction information of the pitch (Rx), the yaw (Ry) and the roll (Rz) of the rear camera may be calculated in operation S541b2. Image conversion operation S520 corresponding to each of operations S541a2 and S541b2 may be reperformed to perform a conversion to a top-view image, to acquire a lane equation and a lane width, and to reperform primary correction operation S541.

Operation S541a1 of determining whether the correction information of the pitch (Rx) of the front camera is accurate, and operation S541b1 of determining whether the correction information of the pitch (Rx) of the rear camera is accurate in primary correction operation S541 are described below.

Figure 5:
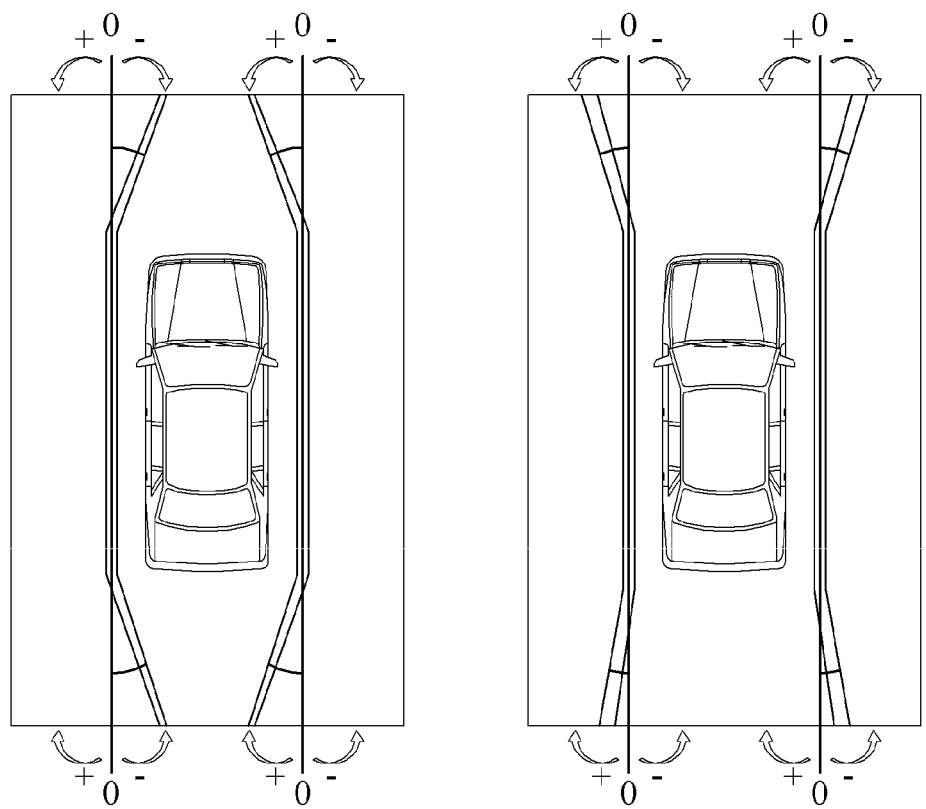
FIG. 5 illustrates an example in which pitches (Rx) of a front camera and a rear camera are twisted in an image acquired from a camera module of FIG. 1.

FIG. 5 illustrates an example in which a pitch (Rx) of a front camera of a vehicle and a pitch (Rx) of a rear camera of the vehicle are twisted. A left image of FIG. 5 illustrates an example in which the pitches (Rx) of the front camera and the rear camera are less than a ground truth value, that is, an actual reference value, and a right image of FIG. 5 illustrates an example in which the pitches (Rx) of the front camera and the rear camera are greater than the ground truth value.

When a slope of a lane is calculated based on a side lane, result values may be expressed as + and −. In other words, when pitches (Rx) of the front camera and the rear camera are different from each other in a top-view image, slopes of lanes may be expressed as + and −. When a "reciprocal (1/$G_l$) of a slope of a left lane=a reciprocal (1/$G_r$) of a slope of a right lane" is satisfied, the pitches (Rx) of the front camera and the rear camera may be accurate external parameters.

Accordingly, operation S541a2 of calculating the correction information of the pitch (Rx) of the front camera and operation S541b2 of calculating the correction information of the pitch (Rx) of the rear camera in primary correction operation S541 may be achieved by estimating new pitches (Rx) of the front camera and the rear camera as shown in Equation 2 below.

$$\text{New } Rx = PreRx - \alpha\left(\frac{1}{G_l} - \frac{1}{G_r}\right) \quad \text{[Equation 2]}$$

New Rx: New pitches of the front camera and the rear camera
Pre Rx: Pitches of the front camera and the rear camera prior to repetition
α: Arbitrary constant value that may be designated by a user
$G_l$: Slope of a left lane
$G_r$: Slope of a right lane In other words, in primary correction operation S541, the correction information of the pitches (Rx) of the front camera and the rear camera may be calculated by gradually modifying a new pitch (Rx) and repeating the process from image conversion operation S520, until "1/$G_l$=1/$G_r$" is satisfied, that is, until Equation 3 shown below is satisfied.

$$\frac{1}{G_l} - \frac{1}{Gr} = 0 \quad \text{[Equation 3]}$$

$G_l$: Slope of a left lane
$G_r$: Slope of a right lane

When the process returns to image conversion operation S520, a top-view image may be generated again based on new pitches (Rx) of the front camera and the rear camera, operation S541a1 of determining whether the correction information of the pitch (Rx) of the front camera is accurate and operation S541b1 of determining whether the correction information of the pitch (Rx) of the rear camera is accurate may be repeated through equation calculation operation S530 of calculating a lane equation in the top-view image.

Operation S541a1 of determining whether the correction information of the yaw (Ry) of the front camera is accurate, and operation S541b1 of determining whether the correction information of the yaw (Ry) of the rear camera is accurate in primary correction operation S541 are described below.

Figure 6:
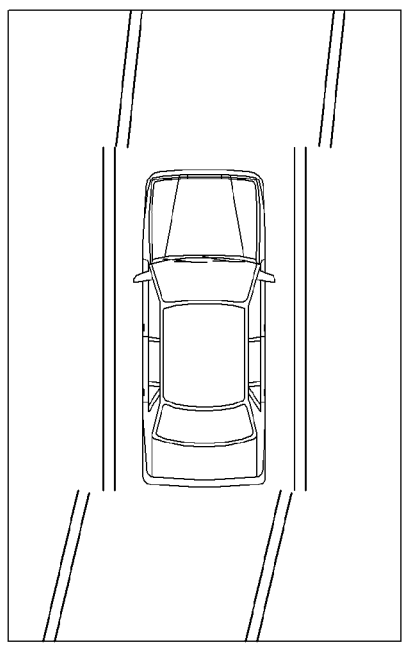
FIG. 6 illustrates an example in which yaws (Ry) of a front camera and a rear camera are twisted in an image acquired from the camera module of FIG. 1.
Figure 6:
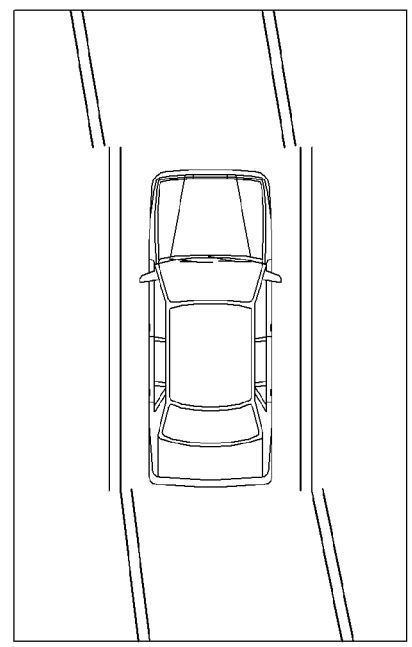

FIG. 6 illustrates an example in which yaws (Ry) of a front camera and a rear camera of a vehicle are twisted. A left image of FIG. 6 illustrates an example in which the yaws (Ry) of the front camera and the rear camera are greater than a ground truth value, that is, an actual reference value, and a right image of FIG. 6 illustrates an example in which the yaws (Ry) of the front camera and the rear camera are less than the ground truth value. In this example, a width between a left lane and a right lane shown in an upper portion of a vehicle image may be different from a width between a left lane and a right lane shown in a lower portion of the vehicle image.

Accordingly, in operations S541a2, 542a2 and 541b2 of primary correction operation S541, the correction information of the yaws (Ry) of the front camera and the rear camera may be calculated by modifying a new yaw (Ry) and repeating the process from image conversion operation S520, until Equations 4 and 5 shown below are satisfied.

$$\text{New } Ry = PreRy + \alpha(W_l - W_r) \quad \text{[Equation 4]}$$

$$W_l - W_r = 0 \quad \text{[Equation 5]}$$

New Ry: New yaws of the front camera and the rear camera
Pre Ry: Yaws of the front camera and the rear camera prior to repetition
α: Arbitrary constant value that may be designated by a user
$W_l$: Width of a left lane
$W_r$: Width of a right lane A process of returning to image conversion operation S520 and repeating primary correction operation S541 is the same as the above-described process associated with the pitches (Rx) of the front camera and the rear camera, and accordingly further description thereof is omitted herein.

Operation S541a1 of determining whether the correction information of the roll (Rz) of the front camera is accurate in primary correction operation S541 is described below.

Figure 7:
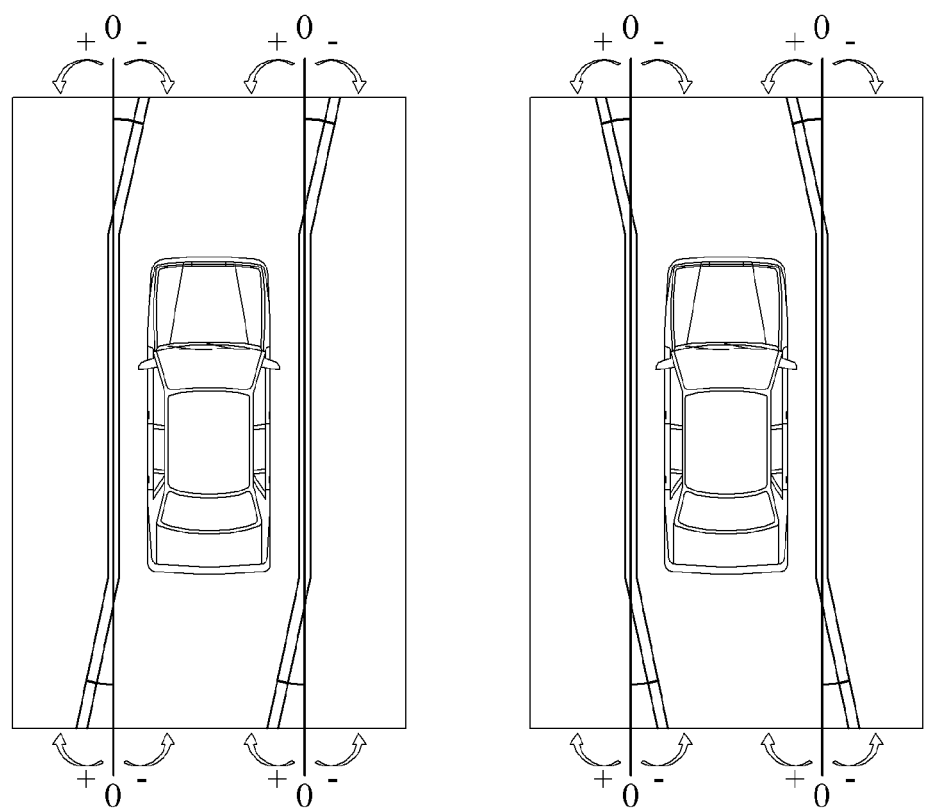
FIG. 7 illustrates an example in which rolls (Rz) of a front camera and a rear camera are twisted in an image acquired from the camera module of FIG. 1.

FIG. 7 illustrates an example in which rolls (Rz) of a front camera and a rear camera of a vehicle are twisted. A left image of FIG. 7 illustrates an example in which the rolls (Rz) of the front camera and the rear camera are greater than a ground truth value, that is, an actual reference value, and a right image of FIG. 7 illustrates an example in which the rolls (Rz) of the front camera and the rear camera are less than the ground truth value. When the rolls (Rz) of the front camera and the rear camera are twisted, $(1/G_l)$ and $(1/G_r)$ may have the same sign and the same value. When the correction information of the roll (Rz) is accurate, a value of "$(1/G_l)+(1/G_r)$" may be close to "0."

Accordingly, in operations S541a2 and 542b2 of primary correction operation S541, the correction information of the rolls (Rz) of the front camera and the rear camera may be calculated by modifying a new roll (Rz) and repeating the process from image conversion operation S520, until Equations 6 and 7 shown below are satisfied.

$$\text{New } Rz = PreRz - \alpha\left(\frac{1}{G_l} + \frac{1}{G_r}\right) \qquad \text{[Equation 6]}$$

$$\frac{1}{G_l} + \frac{1}{Gr} = 0 \qquad \text{[Equation 7]}$$

New Rz: New rolls of the front camera and the rear camera

Pre Ry: Rolls of the front camera and the rear camera prior to repetition

α: Arbitrary constant value that may be designated by a user $G_l$: Slope of a left lane $G_r$: Slope of a right lane A process of returning to image conversion operation S520 and repeating primary correction operation S541 is the same as the above-described process associated with the pitches (Rx) of the front camera and the rear camera, and accordingly further description thereof is omitted herein.

In secondary correction operation S542, whether correction information of a position translation (Tz) of the rear camera is accurate may be determined in operation S542a1. When the correction information is accurate, the next operation may be performed. When the correction information is inaccurate, the correction information of the position translation (Tz) of the rear camera may be calculated in operation S542a2 and image conversion operation S520 may be reperformed.

Operation S542a1 of determining whether the correction information of the rear camera is accurate in secondary correction operation S542 is described below.

Figure 8:
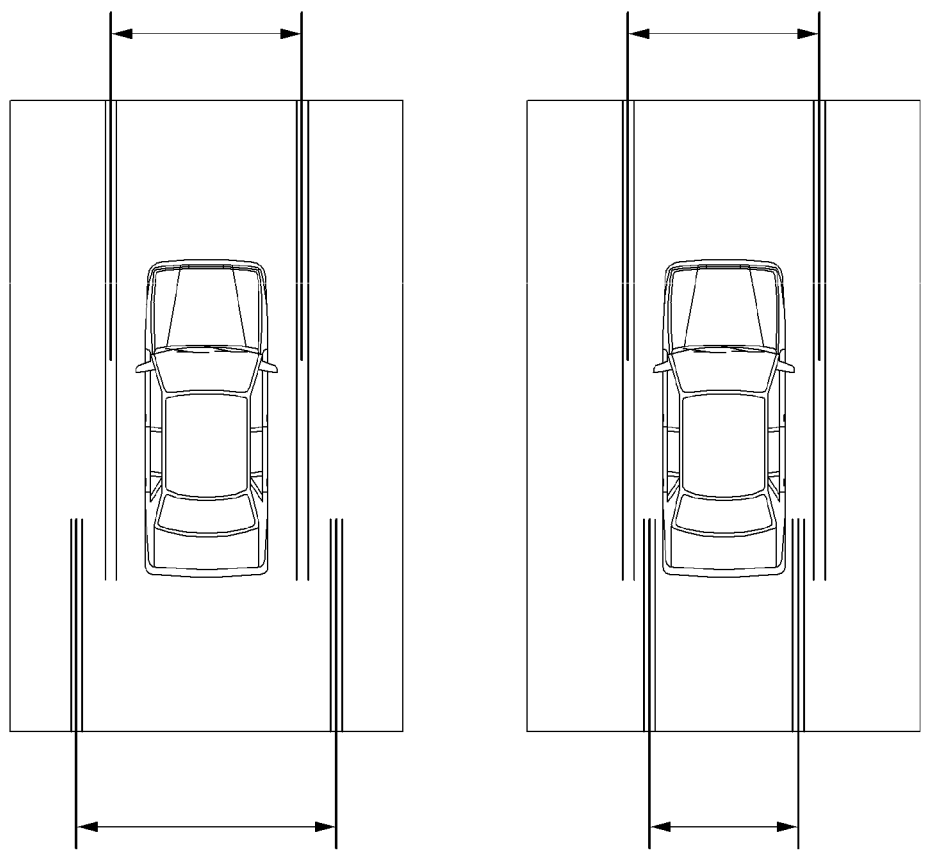
FIG. 8 illustrates an example in which a position translation (Tz) of a rear camera is twisted in an image acquired from the camera module of FIG. 1.

FIG. 8 illustrates an example in which a position translation (Tz) of a rear camera of a vehicle is twisted. A left image of FIG. 8 illustrates an example in which position translations (Tz) of the front camera and the rear camera are greater than a ground truth value, that is, an actual reference value, and a right image of FIG. 7 illustrates an example in which the position translations (Tz) of the front camera and the rear camera are less than the ground truth value. When the position translation (Tz) of the rear camera is twisted, a width between lanes of a road in front of a vehicle and a width between lanes of a road behind the vehicle may be different from each other. When the position translation (Tz) is accurate, the widths may be identical to each other.

Accordingly, in operation S542a2 of secondary correction operation S542, the correction information of the position translation (Tz) of the rear camera may be calculated by modifying a new position translation (Tz) and repeating the process from the image conversion operation until Equations 8 and 9 shown below are satisfied.

$$\text{New } Tz = PreTz - \alpha(C_f - C_r) \qquad \text{[Equation 8]}$$

$$C_f - C_r = 0 \qquad \text{[Equation 9]}$$

New Tz: New position translations of the front camera and the rear camera

Pre Tz: Position translations of the front camera and the rear camera prior to repetition α: Arbitrary constant value that may be designated by a user $C_f$: Width between a left lane and a right lane of a front road $C_r$: Width between a left lane and a right lane of a rear road A process of returning to image conversion operation S520 and repeating secondary correction operation S542 is the same as the above-described process associated with the pitches (Rx) of the front camera and the rear camera, and accordingly further description thereof is omitted herein.

In tertiary correction operation S543, whether correction information of pitches (Rx), yaws (Ry), rolls (Rz) and position translations (Tz) of a left camera and a right camera of the vehicle is accurate is determined in operations S543a1 and 543b1. When the correction information is accurate, the next operation may be performed. When the correction information is inaccurate, the correction information of the pitches (Rx), the yaws (Ry), the rolls (Rz) and the position translations (Tz) of the left camera and the right camera may be calculated in operations S543a2 and S543b2, and image conversion operation S520 may be reperformed.

Operations S543a1 and 543b1 of determining whether the correction information of the pitches (Rx) of the left camera and the right camera is accurate in tertiary correction operation S543 are described below.

Figure 9:
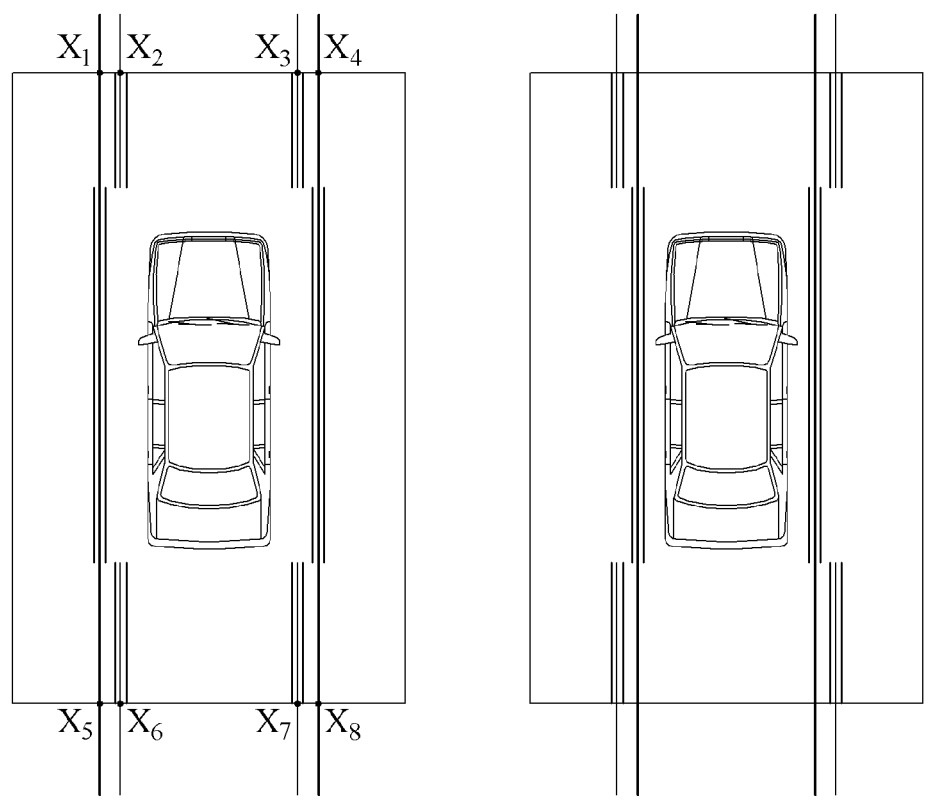
FIG. 9 illustrates an example in which pitches (Rx) of a left camera and a right camera are twisted in an image acquired from the camera module of FIG. 1.

FIG. 9 illustrates an example in which pitches (Rx) of a left camera and a right camera of a vehicle are twisted. A left image of FIG. 9 illustrates an example in which the pitches (Rx) of the left camera and the right camera are greater than a ground truth value, that is, an actual reference value, and a right image of FIG. 9 illustrates an example in which the pitches (Rx) of the left camera and the right camera are less than the ground truth value. When the pitches (Rx) of the left camera and the right camera are twisted, lanes located in a front side and a rear side of the vehicle, and lanes located in a left side and a right side of the vehicle may not be on one straight line and not be aligned. When the pitches (Rx) are accurate, the lanes may be on one straight line.

Accordingly, in operation S543a2 of tertiary correction operation S543, the correction information of the pitch (Rx) of the left camera may be calculated by modifying a new pitch (Rx) and repeating the process from image conversion operation S520 until Equations 10 and 11 shown below are satisfied.

$$LeftCameraNewRx = LeftCameraPreRx - \alpha\left(\frac{(x_2 + x_6)}{2} - \frac{(x_1 + x_5)}{2}\right) \qquad \text{[Equation 10]}$$

$$\frac{(x_2 + x_6)}{2} - \frac{(x_1 + x_5)}{2} = 0 \qquad \text{[Equation 11]}$$

New Rx: New pitch of the left camera

Pre Rx: Pitch of the left camera prior to repetition

α: Arbitrary constant value that may be designated by a user $x_1$: Left x-coordinate of a left lane of a front road $x_2$: Right x-coordinate of the left lane of the front road $x_5$: Left x-coordinate of a left lane of a rear road $x_6$: Right x-coordinate of the left lane of the rear road A process of returning to image conversion operation S520 and repeating tertiary correction operation S543 is the same as the above-described process associated with the pitches (Rx) of the front camera and the rear camera, and accordingly further description thereof is omitted herein.

Also, in operation S543b2 of tertiary correction operation S543, the correction information of the pitch (Rx) of the right camera may be calculated by modifying a new pitch (Rx) and repeating the process from the image conversion operation until Equations 12 and 13 shown below are satisfied.

$$RightCameraNewRx = RightCameraPreRx - \alpha\left(\frac{(x_3+x_7)}{2} - \frac{(x_4+x_8)}{2}\right)$$ [Equation 12]

$$\frac{(x_3+x_7)}{2} - \frac{(x_4+x_8)}{2} = 0$$ [Equation 13]

New Rx: New pitch of the right camera
Pre Rx: Pitch of the right camera prior to repetition
α: Arbitrary constant value that may be designated by a user
$x_3$: Left x-coordinate of a right lane of a front road
$x_4$: Right x-coordinate of the right lane of the front road
$x_7$: Left x-coordinate of a right lane of a rear road
$x_8$: Right x-coordinate of the right lane of the rear road A process of returning to image conversion operation S520 and repeating tertiary correction operation S543 is the same as the above-described process associated with the pitches (Rx) of the front camera and the rear camera, and accordingly further description thereof is omitted herein.

Operations S543a1 and S543b1 of determining whether the correction information of the yaws (Ry) of the left camera and the right camera is accurate in tertiary correction operation S543 are described below.

Figure 10:
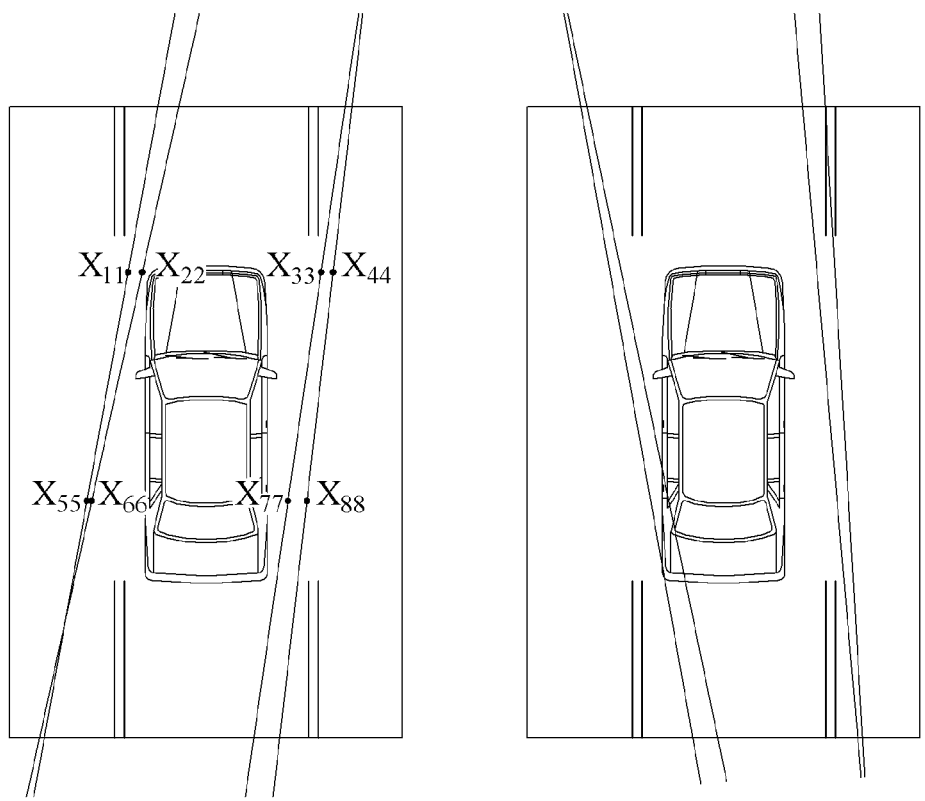
FIG. 10 illustrates an example in which yaws (Ry) of a left camera and a right camera are twisted in an image acquired from the camera module of FIG. 1.

FIG. 10 illustrates an example in which yaws (Ry) of a left camera and a right camera of a vehicle are twisted. A left image of FIG. 10 illustrates an example in which the yaws (Ry) of the left camera and the right camera are greater than a ground truth value, that is, an actual reference value, and a right image of FIG. 10 illustrates an example in which the yaws (Ry) of the left camera and the right camera are less than the ground truth value. When the yaws (Ry) of the left camera and the right camera are accurate, $(x_{22}-x_{11})$ and $(x_{66}-x_{55})$ may be identical to each other, or $(x_{44}-x_{33})$ and $(x_{88}-x_{77})$ may be identical to each other.

Accordingly, in operation S543a2 of tertiary correction operation S543, the correction information of the yaw (Ry) of the left camera may be calculated by modifying a new yaw (Ry) and repeating the process from image conversion operation S520 until Equations 14 and 15 shown below are satisfied.

$$LeftCameraNewRy = LeftCameraPreRy - \alpha((x_{22}-x_{11})-(x_{66}-x_{55}))$$ [Equation 14]

$$(x_{22}-x_{11})-(x_{66}-x_{55})=0$$ [Equation 15]

New Ry: New yaw of the left camera
Pre Ry: Yaw of the left camera prior to repetition
α: Arbitrary constant value that may be designated by a user
$x_{11}$: Left x-coordinate of a left lane of a front road
$x_{22}$: Right x-coordinate of the left lane of the front road
$x_{55}$: Left x-coordinate of a left lane of a rear road
$x_{66}$: Right x-coordinate of the left lane of the rear road A process of returning to image conversion operation S520 and repeating tertiary correction operation S543 is the same as the above-described process associated with the pitches (Rx) of the front camera and the rear camera, and accordingly further description thereof is omitted herein.

Also, in operation S543b2 of tertiary correction operation S543, the correction information of the yaw (Ry) of the right camera may be calculated by modifying a new yaw (Ry) and repeating the process from the image conversion operation until Equations 16 and 17 shown below are satisfied.

$$RightCameraNewRy = RightCameraPreRy + \alpha((x_{44}-x_{33})-(x_{88}-x_{77}))$$ [Equation 16]

$$(x_{44}-x_{33})-(x_{88}-x_{77})=0$$ [Equation 17]

New Ry: New yaw of the right camera
Pre Ry: Yaw of the right camera prior to repetition
α: Arbitrary constant value that may be designated by a user
$x_{33}$: Left x-coordinate of a right lane of a front road
$x_{44}$: Right x-coordinate of the right lane of the front road
$x_{77}$: Left x-coordinate of a right lane of a rear road
$x_{88}$: Right x-coordinate of the right lane of the rear road A process of returning to image conversion operation S520 and repeating tertiary correction operation S543 is the same as the above-described process associated with the pitches (Rx) of the front camera and the rear camera, and accordingly further description thereof is omitted herein.

Operations S543a1 and S543b1 of determining whether the correction information of the rolls (Rz) of the left camera and the right camera in tertiary correction operation S543 are described below.

Figure 11:
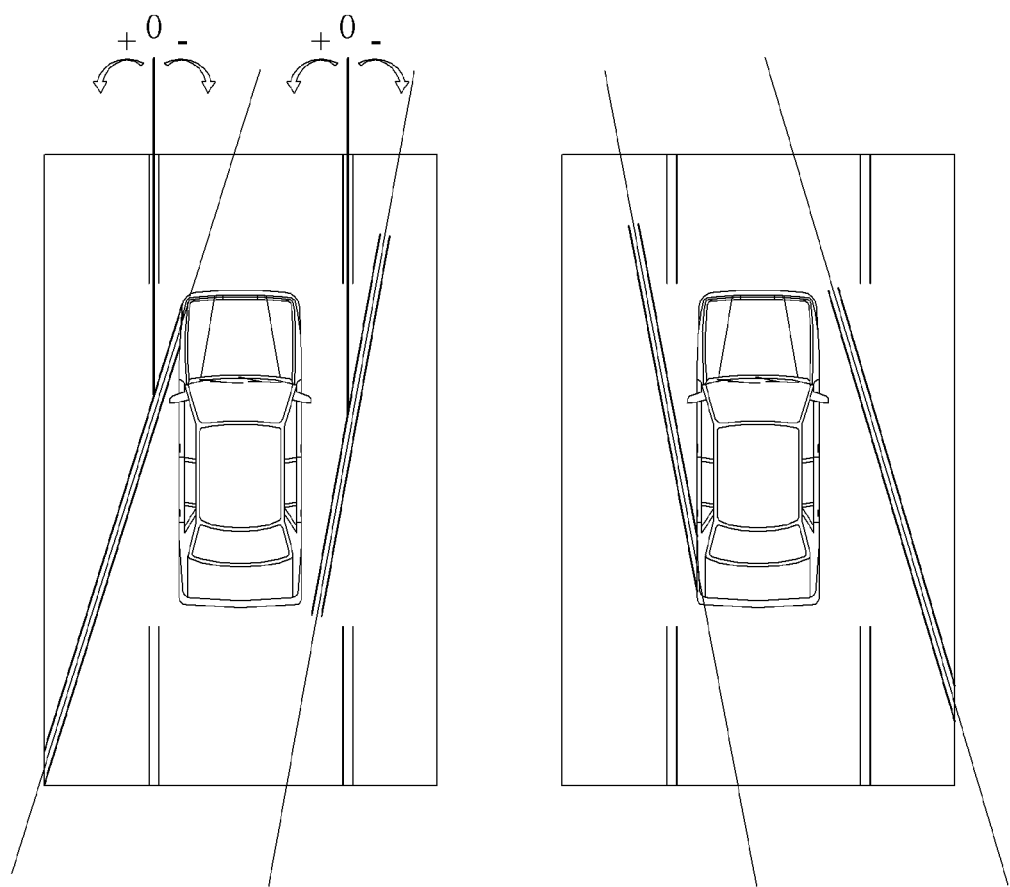
FIG. 11 illustrates an example in which rolls (Rz) of a left camera and a right camera are twisted in an image acquired from the camera module of FIG. 1.

FIG. 11 illustrates an example in which rolls (Rz) of a left camera and a right camera of a vehicle are twisted. A left image of FIG. 11 illustrates an example in which the rolls (Rz) of the left camera and the right camera are greater than a ground truth value, that is, an actual reference value, and a right image of FIG. 11 illustrates an example in which the rolls (Rz) of the left camera and the right camera are less than the ground truth value. When the rolls (Rz) of the left camera and the right camera are twisted, $1/G_l$, and $1/G_r$ may have greater values. When the rolls (Rz) are accurate, $1/G_l$ and $1/G_r$ may have values close to "0."

Accordingly, in operation S543a2 of tertiary correction operation S543, the correction information of the roll (Rz) of the left camera may be calculated by modifying a new roll (Rz) and repeating the process from the image conversion operation until Equations 18 and 19 shown below are satisfied.

$$leftCameraNewRz = leftCameraPreRz - \alpha\left(\frac{1}{G_l}\right)$$ [Equation 18]

$$\frac{1}{G_l} = 0$$ [Equation 19]

New Rz: New roll of the left camera
Pre Rz: Roll of the left camera prior to repetition
α: Arbitrary constant value that may be designated by a user
$G_l$: Slope of a left lane A process of returning to image conversion operation S520 and repeating tertiary correction operation S543 is the same as the above-described process associated with the pitches (Rx) of the front camera and the rear camera, and accordingly further description thereof is omitted herein.

Also, in operation S543b2 of tertiary correction operation S543, the correction information of the roll (Rz) of the right camera may be calculated by modifying a new roll (Rz) and repeating the process from the image conversion operation until Equations 20 and 21 shown below are satisfied.

$$RightCameraNewRz = RightCameraPreRz - \alpha\left(\frac{1}{G_r}\right) \quad \text{[Equation 20]}$$

$$\frac{1}{G_r} = 0 \quad \text{[Equation 21]}$$

New Rz: New roll of the right camera
Pre Rz: Roll of the right camera prior to repetition
α: Arbitrary constant value that may be designated by a user
$G_r$: Slope of a right lane
A process of returning to image conversion operation S520 and repeating tertiary correction operation S543 is the same as the above-described process associated with the pitches (Rx) of the front camera and the rear camera, and accordingly further description thereof is omitted herein.

Operations S543a1 and S543b1 of determining whether the correction information of the position translations (Tz) of the left camera and the right camera is accurate in tertiary correction operation S543 are described below.

Figure 12:
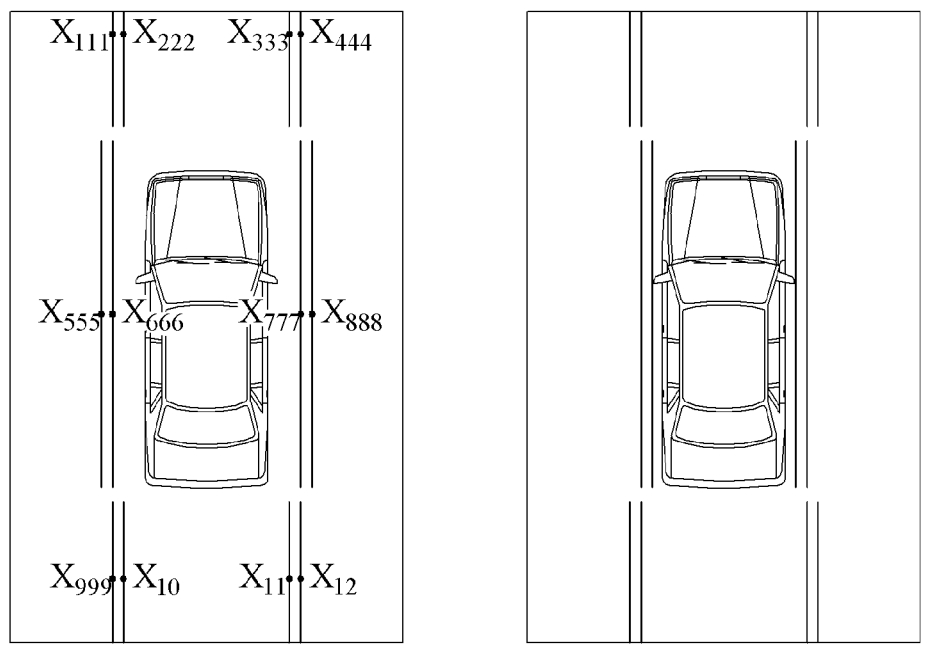
FIG. 12 illustrates an example in which position translations (Tz) of a left camera and a right camera are twisted in an image acquired from the camera module of FIG. 1.

FIG. 12 illustrates an example in which position translations (Tz) of a left camera and a right camera of a vehicle are twisted. A left image of FIG. 12 illustrates an example in which the position translations (Tz) of the left camera and the right camera are greater than a ground truth value, that is, an actual reference value, and a right image of FIG. 12 illustrates an example in which the position translations (Tz) of the left camera and the right camera are less than the ground truth value. When the position translations (Tz) of the left camera and the right camera are accurate, widths between lanes on the front side and the rear side of the vehicle may be identical to widths between lanes on the left side and the right side of the vehicle.

Accordingly, in operation S543a2 of tertiary correction operation S543, the correction information of the position translation (Tz) of the left camera may be calculated by modifying a new position translation (Tz) and repeating the process from the image conversion operation until Equations 22 and 23 shown below are satisfied.

$$LeftCameraNewTz = LeftCameraPreTz - \alpha\left(\frac{(x_{222} - x_{111}) + (x_{10} - x_{999})}{2} - (x_{666} - x_{555})\right) \quad \text{[Equation 22]}$$

$$\frac{(x_{222} - x_{111}) + (x_{10} - x_{999})}{2} - (x_{666} - x_{555}) = 0 \quad \text{[Equation 23]}$$

New Tz: New position translation of the left camera
Pre Tz: Position translation of the left camera prior to repetition
α: Arbitrary constant value that may be designated by a user
$x_{111}$: Left x-coordinate of a left lane of a front road
$x_{222}$: Right x-coordinate of the left lane of the front road
$x_{555}$: Left x-coordinate of a left lane
$x_{666}$: Right x-coordinate of the left lane
$x_{999}$: Left x-coordinate of a left lane of a rear road
$x_{10}$: Right x-coordinate of the left lane of the rear road
A process of returning to image conversion operation S520 and repeating tertiary correction operation S543 is the same as the above-described process associated with the pitches (Rx) of the front camera and the rear camera, and accordingly further description thereof is omitted herein.

Also, in operation S543b2 of tertiary correction operation S543, the correction information of the position translation (Tz) of the right camera may be calculated by modifying a new position translation (Tz) and repeating the process from the image conversion operation until Equations 24 and 25 shown below are satisfied.

$$RightCameraNewTz = ReftCameraPreTz + \alpha\left(\frac{(x_{444} - x_{333}) + (x_{10} - x_{999})}{2} - (x_{888} - x_{777})\right) \quad \text{[Equation 24]}$$

$$\frac{(x_{444} - x_{333}) + (x_{12} - x_{11})}{2} - (x_{888} - x_{777}) = 0 \quad \text{[Equation 25]}$$

New Tz: New position translation of the right camera
Pre Tz: Position translation of the right camera prior to repetition
α: Arbitrary constant value that may be designated by a user
$x_{333}$: Left x-coordinate of a right lane of a front road
$x_{444}$: Right x-coordinate of the right lane of the front road
$x_{777}$: Left x-coordinate of a right lane
$x_{888}$: Right x-coordinate of the right lane
$x_{11}$: Left x-coordinate of a right lane of a rear road
$x_{12}$: Right x-coordinate of the right lane of the rear road
A process of returning to image conversion operation S520 and repeating tertiary correction operation S543 is the same as the above-described process associated with the pitches (Rx) of the front camera and the rear camera, and accordingly further description thereof is omitted herein.

Storage operation S544 may be an operation of repeatedly performing primary correction operation S541, secondary correction operation S542 and tertiary correction operation S543 until accurate correction is realized, and of storing a finally calculated external parameter.

Image correction operation S550 may be an operation of correcting an image based on a new external parameter estimated in parameter estimation operation S540, and the corrected image may be transmitted to the storage 220 of the input/output module 200.

As a result, in the vehicle camera calibration apparatus and method according to an example embodiment, it is possible to automatically calibrate an external parameter even when a vehicle is travelling.

As described above, according to example embodiments, a camera calibration may be performed by receiving images representing a travelling road of a vehicle from a plurality of cameras installed in the vehicle, by detecting a lane from the images, and by correcting an external parameter of a camera installed in the vehicle based on the detected lane. Thus, it is possible to quickly and simply calibrate a camera without a need to stop the vehicle.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A vehicle camera calibration method comprising:
    a lane detection operation of receiving, as an input, an acquired image from a camera module, and detecting a lane;
    an image conversion operation of extracting a feature point of a lane from a received image based on initial camera information and external parameter information, and converting the received image into a top-view image;
    an equation calculation operation of acquiring a lane equation and a lane width from the top-view image acquired in the image conversion operation;
    a parameter estimation operation of estimating a new external parameter using the lane equation and the lane width calculated in the equation calculation operation; and
    an image correction operation of correcting an image using the new external parameter estimated in the parameter estimation operation,
    wherein the lane detection operation comprises an image processing operation of removing noise from an image received from an input/output module by performing an algorithm of softening a boundary of an object in an image to remove noise.

2. The vehicle camera calibration method of claim 1, wherein the lane detection operation further comprises:
    a frame accumulation operation of accumulating images processed in the image processing operation as consecutive frames when a lane is marked with a dashed line in an image processed in the image processing operation, and performing a next operation when the lane is marked with a straight line;
    an edge detection operation of detecting an edge and extracting a feature point from a cumulative image including the images accumulated in the frame accumulation operation; and
    a lane determination operation of determining a lane from the feature point extracted in the edge detection operation.

3. The vehicle camera calibration method of claim 2, wherein the image processing operation comprises removing noise by changing a size of an image to prevent a region corresponding to a split lane in an acquired image from being detected as an edge.

4. The vehicle camera calibration method of claim 2, wherein the frame accumulation operation comprises comparing all pixel values of the cumulative image and storing a highest pixel value in a new image so that a dashed-line lane in an acquired image is viewed to be identical to a solid-line lane.

5. The vehicle camera calibration method of claim 2, wherein the edge detection operation comprises detecting an edge using an algorithm and extracting the edge and central coordinates of the edge as feature points.

6. The vehicle camera calibration method of claim 2, wherein the lane determination operation comprises detecting a longest outline among lines represented by feature points extracted in the edge detection operation and determining the longest outline as a lane.

7. The vehicle camera calibration method of claim 1, wherein the lane equation calculated in the equation calculation operation is expressed as an equation of a straight line, or a multi-dimensional equation.

8. The vehicle camera calibration method of claim 1, wherein the parameter estimation operation comprises:
    a primary correction operation of determining whether correction information of a pitch (Rx), a yaw (Ry) and a roll (Rz) of a front camera of a vehicle, and correction information of a pitch (Rx), a yaw (Ry) and a roll (Rz) of a rear camera of the vehicle are accurate, of performing a next operation when the correction information is accurate, and of calculating the correction information of the pitch (Rx), the yaw (Ry) and the roll (Rz) of the front camera and the correction information of the pitch (Rx), the yaw (Ry) and the roll (Rz) of the rear camera and returning to the image conversion operation when the correction information is inaccurate;
    a secondary correction operation of determining whether correction information of a position translation (Tz) of a rear camera of a vehicle is accurate, of performing a next operation when the correction information is accurate, and of calculating the correction information of the position translation (Tz) of the rear camera and returning to the image conversion operation when the correction information is inaccurate;
    a tertiary correction operation of determining whether correction information of a pitch (Rx), a yaw (Ry), a roll (Rz) and a position translation (Tz) of each of a left camera and a right camera of a vehicle is accurate, of performing a next operation when the correction information is accurate, and of calculating the correction information of the pitch (Rx), the yaw (Ry), the roll (Rz) and the position translation (Tz) of each of the left camera and the right camera and returning to the image conversion operation when the correction information is inaccurate; and
    a storage operation of storing external parameters calculated in the primary correction operation through the tertiary correction operation.

9. The vehicle camera calibration method of claim 8, wherein the correction information of the pitch (Rx) of each of the front camera and the rear camera in the primary correction operation is calculated by modifying a new pitch (Rx) and repeating a process from the image conversion operation until Equation 1 shown below is satisfied:

$$\frac{1}{G_l} - \frac{1}{G_r} = 0 \qquad \text{[Equation 1]}$$

wherein $G_l$ denotes a slope of a left lane, and $G_r$ denotes a slope of a right lane.

10. The vehicle camera calibration method of claim 8, wherein the correction information of the yaw (Ry) of each of the front camera and the rear camera in the primary correction operation and the secondary correction operation is calculated by modifying a new yaw (Ry) and repeating a process from the image conversion operation until Equation 2 shown below is satisfied:

$$W_l - W_r = 0 \qquad \text{[Equation 2]}$$

wherein $W_l$ denotes a width of a left lane, and $W_r$ denotes a width of a right lane.

11. The vehicle camera calibration method of claim 8, wherein the correction information of the roll (Rz) of each of the front camera and the rear camera in the primary correction operation is calculated by modifying a new roll (Rz) and repeating a process from the image conversion operation until Equation 3 shown below is satisfied:

$$\frac{1}{G_l} + \frac{1}{G_r} = 0 \quad \text{[Equation 3]}$$

wherein $G_l$ denotes a slope of a left lane, and $G_r$ denotes a slope of a right lane.

12. The vehicle camera calibration method of claim 8, wherein the correction information of the position translation (Tz) of the rear camera in the secondary correction operation is calculated by modifying a new position translation (Tz) and repeating a process from the image conversion operation until Equation 4 shown below is satisfied:

$$C_f - C_r = 0 \quad \text{[Equation 4]}$$

wherein $C_f$ denotes a width between a left lane and a right lane in a front road, and $C_r$ denotes a width between a left lane and a right lane in a rear road.

13. The vehicle camera calibration method of claim 8, wherein
the correction information of the pitch (Rx) of the left camera in the tertiary correction operation is calculated by modifying a new pitch (Rx) and repeating a process from the image conversion operation until Equation 5 shown below is satisfied, and
the correction information of the pitch (Rx) of the right camera in the tertiary correction operation is calculated by modifying a new pitch (Rx) and repeating a process from the image conversion operation until Equation 6 shown below is satisfied:

$$\frac{(x_2 + x_6)}{2} - \frac{(x_1 + x_5)}{2} = 0 \quad \text{[Equation 5]}$$

$$\frac{(x_3 + x_7)}{2} - \frac{(x_4 + x_8)}{2} = 0 \quad \text{[Equation 6]}$$

wherein $x_1$ denotes a left x-coordinate of a left lane of a front road, $x_2$ denotes a right x-coordinate of the left lane of the front road, $x_5$ denotes a left x-coordinate of a left lane of a rear road, $x_6$ denotes a right x-coordinate of the left lane of the rear road, $x_3$ denotes a left x-coordinate of a right lane of the front road, $x_4$ denotes a right x-coordinate of the right lane of the front road, $x_7$ denotes a left x-coordinate of a right lane of the rear road, and $x_8$ denotes a right x-coordinate of the right lane of the rear road.

14. The vehicle camera calibration method of claim 8, wherein
the correction information of the yaw (Ry) of the left camera in the tertiary correction operation is calculated by modifying a new yaw (Ry) and repeating a process from the image conversion operation until Equation 7 shown below is satisfied, and
the correction information of the yaw (Ry) of the right camera in the tertiary correction operation is calculated by modifying a new yaw (Ry) and repeating a process from the image conversion operation until Equation 8 shown below is satisfied:

$$(x_{22} - x_{11}) - (x_{66} - x_{55}) = 0 \quad \text{[Equation 7]}$$

$$(x_{44} - x_{33}) - (x_{88} - x_{77}) = 0 \quad \text{[Equation 8]}$$

wherein $x_{11}$ denotes a left x-coordinate of a left lane of a front road, $x_{22}$ denotes a right x-coordinate of the left lane of the front road, $x_{55}$ denotes a left x-coordinate of a left lane of a rear road, $x_{66}$ denotes a right x-coordinate of the left lane of the rear road, $x_{33}$ denotes a left x-coordinate of a right lane of the front road, $x_{44}$ denotes a right x-coordinate of the right lane of the front road, $x_{77}$ denotes a left x-coordinate of a right lane of the rear road, and $x_{88}$ denotes a right x-coordinate of the right lane of the rear road.

15. The vehicle camera calibration method of claim 8, wherein
the correction information of the roll (Rz) of the left camera in the tertiary correction operation is calculated by modifying a new roll (Rz) and repeating a process from the image conversion operation until Equation 9 shown below is satisfied, and
the correction information of the roll (Rz) of the right camera in the tertiary correction operation is calculated by modifying a new roll (Rz) and repeating a process from the image conversion operation until Equation 10 shown below is satisfied:

$$\frac{1}{G_l} = 0 \quad \text{[Equation 9]}$$

$$\frac{1}{G_r} = 0 \quad \text{[Equation 10]}$$

wherein $G_l$ denotes a slope of a left lane, and $G_r$ denotes a slope of a right lane.

16. The vehicle camera calibration method of claim 8, wherein
the correction information of the position translation (Tz) of the left camera in the tertiary correction operation is calculated by modifying a new position translation (Tz) and repeating a process from the image conversion operation until Equation 11 shown below is satisfied, and
the correction information of the position translation (Tz) of the right camera in the tertiary correction operation is calculated by modifying a new position translation (Tz) and repeating a process from the image conversion operation until Equation 12 shown below is satisfied:

$$\frac{(x_{222} - x_{111}) + (x_{10} - x_{999})}{2} - (x_{666} - x_{555}) = 0 \quad \text{[Equation 11]}$$

$$\frac{(x_{444} - x_{333}) + (x_{12} - x_{11})}{2} - (x_{888} - x_{777}) = 0 \quad \text{[Equation 12]}$$

wherein $x_{111}$ denotes a left x-coordinate of a left lane of a front road, $x_{222}$ denotes a right x-coordinate of the left lane of the front road, $x_{555}$ denotes a left x-coordinate of a left lane, $x_{666}$ denotes a right x-coordinate of the left lane, $x_{999}$ denotes a left x-coordinate of a left lane of the rear road, $x_{10}$ denotes a right x-coordinate of the left lane of the rear road, $x_{333}$ denotes a left x-coordinate of a right lane of a front road, $x_{444}$ denotes a right x-coordinate of a right lane of a front road, $x_{777}$ denotes a left x-coordinate of a right lane, $x_{888}$ denotes a right x-coordinate of a right lane, $x_{11}$ denotes a left x-coordinate of a right lane of the rear road, and $x_{12}$ denotes a right x-coordinate of the right lane of the rear road.

* * * * *